(12) United States Patent
Neidig et al.

(10) Patent No.: US 11,609,555 B2
(45) Date of Patent: Mar. 21, 2023

(54) DEVICE AND METHOD FOR AUTOMATIC CALCULATION OF MEASUREMENT CONFIDENCE IN FLEXIBLE MODULAR PLANTS AND MACHINES

(71) Applicant: Siemens Aktiengesellschaft, Munich (DE)

(72) Inventors: Jörg Neidig, Nuremberg (DE); Markus M. Geipel, Munich (DE); Mathias Maurmaier, Gerlingen (DE); Kai Wurm, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/634,648

(22) PCT Filed: Jul. 13, 2020

(86) PCT No.: PCT/EP2020/069694
§ 371 (c)(1),
(2) Date: Feb. 11, 2022

(87) PCT Pub. No.: WO2021/028134
PCT Pub. Date: Feb. 18, 2021

(65) Prior Publication Data
US 2022/0269250 A1     Aug. 25, 2022

(30) Foreign Application Priority Data

Aug. 13, 2019 (EP) .................................... 19191375

(51) Int. Cl.
*G05B 19/418* (2006.01)
*G05B 19/042* (2006.01)
*G05B 19/05* (2006.01)

(52) U.S. Cl.
CPC ... *G05B 19/41845* (2013.01); *G05B 19/0426* (2013.01); *G05B 19/056* (2013.01);
(Continued)

(58) Field of Classification Search
CPC .......... G05B 19/41485; G05B 19/0426; G05B 19/056; G05B 2219/25428;
(Continued)

(56) References Cited

U.S. PATENT DOCUMENTS

| 7,539,593 | B2 | 5/2009 | Machacek |
| 8,560,468 | B1 | 10/2013 | Lerman et al. |

(Continued)

FOREIGN PATENT DOCUMENTS

| CN | 101149618 | 3/2008 |
| CN | 104081298 | 10/2014 |

(Continued)

OTHER PUBLICATIONS

PCT International Search Report and Written Opinion of International Searching Authority dated Oct. 6, 2020, corresponding to PCT International Application No. PCT/EP2020/069694 filed Jul. 13, 2020.
(Continued)

*Primary Examiner* — Jigneshkumar C Patel
(74) *Attorney, Agent, or Firm* — Cozen O'Connor

(57) ABSTRACT

A method for providing output values with associated uncertainties for a flexible modular plant or machine comprising an arrangement of modular entities, wherein uncertainty information associated with an operation of the modular entity is assigned to a plurality of modular entities and input values are provided based on an operation of the modular entities, where a computing unit calculates an output value based on said input values, calculates an input value uncertainty for each input value based on the uncertainty information of the modular entity, and calculates at least one output value uncertainty associated with the output value based on propagation of uncertainty and using the input value uncertainties, and where the output value and the at least one output value uncertainty are output.

14 Claims, 4 Drawing Sheets

(52) U.S. Cl.
CPC .............. *G05B 2219/25428* (2013.01); *G05B 2219/31211* (2013.01); *G05B 2219/32368* (2013.01); *G05B 2219/33046* (2013.01)

(58) Field of Classification Search
CPC ........... G05B 2219/31211; G05B 2219/32368; G05B 2219/33046
USPC ........................................................... 700/9
See application file for complete search history.

(56) References Cited

U.S. PATENT DOCUMENTS

| | | | |
|---|---|---|---|
| 2004/0260526 A1* | 12/2004 | Hall | G06F 17/18 703/12 |
| 2008/0114559 A1 | 5/2008 | Yamaguchi et al. | |
| 2013/0173028 A1* | 7/2013 | Felty | G05B 13/02 700/79 |
| 2014/0344010 A1 | 11/2014 | Gutermuth et al. | |
| 2018/0231394 A1* | 8/2018 | Goh | G01D 3/08 |

FOREIGN PATENT DOCUMENTS

| | | |
|---|---|---|
| CN | 106991252 | 7/2017 |
| DE | 102016101237 | 7/2017 |
| EP | 0862683 | 9/1998 |
| NZ | 512212 | 4/2004 |

OTHER PUBLICATIONS

International Preliminary Report on Patentability dated Jul. 28, 2021 based on PCT/EP2020/069694 filed Jul. 13, 2020.

\* cited by examiner

DEVICE AND METHOD FOR AUTOMATIC CALCULATION OF MEASUREMENT CONFIDENCE IN FLEXIBLE MODULAR PLANTS AND MACHINES

CROSS-REFERENCE TO RELATED APPLICATIONS

This is a U.S. national stage of application No. PCT/EP2020/069694 filed 13 Jul. 2020. Priority is claimed on European Application No. 19191375.5 filed 13 Aug. 2019, the content of which is incorporated herein by reference in its entirety.

BACKGROUND OF THE INVENTION

1. Field of the Invention

The invention relates to a method and a device for providing output values with associated uncertainties for a flexible modular plant or machine.

2. Description of the Related Art

Manufacturing plants based on modular entities is beneficial with regard to an increased flexibility in plant arrangement, a reduction of safety concerns during construction of the modular plant and with regard to easier modification and replacement of modular entities.

The modular entities or equipment of such flexible modular plants may comprise components such as electrical wiring, walls, pipes, machines, actuators and sensors. The modular entities are installed in accordance with a certain arrangement that describes the way in which the modular entities are connected to each other or interconnected.

Sensors can measure physical and chemical properties and provide measurement data that is afflicted with measurement uncertainties. The degree and type of uncertainty can be specified in the documentation of the respective sensor and may be certified by appropriate authorities.

If the measurement data is transformed or combined with other data, e.g., in the way of sensor fusion, propagation of uncertainty or error propagation becomes relevant. Definitions, formal representations and propagation of measurement uncertainties are standardized and given in norms such as DIN 1319 or IEEE-754. Additional uncertainties may occur through the limited representation of numbers in digital processes, e.g., by using floating-point representations.

For flexible modular plants, the setup of the plant and the available measurement equipment is not known at the design stage. During runtime, it is decided which process is to be executed on which equipment or entity by a system implementing methods such as Supervisory Control and Data Acquisition (SCADA), Manufacturing Operation Management (MOM) and Manufacturing Execution System (MES).

EP 0 862 683 A1- Hartmann "METHOD OF QUALIFYING A BOREHOLE SURVEY" discloses determining the un-certainty of a measured parameter.

U.S. Pat. No. 7,539,593 B2- Machacek "SELF-VALIDATED MEASUREMENT SYSTEMS" discloses a sensor that delivers uncertainty data along with the sensed values.

DE 10 2016 101 237 A1- Berlinger et al. "Anordnung an einem Behältnis und/oder einer Rohrleitung umfassend zumindest ein Feldgerät der Automatisierungstechnik" describes the collection of environmental parameters in the vicinity of a sensor, where the environmental parameters influence the uncertainty of sensed values of the sensor.

Therefore, if input values from a plurality of modular entities are combined to provide an output value, then it is not possible to calculate the measurement uncertainties during design time.

SUMMARY OF THE INVENTION

In view of the foregoing, it is therefore an object of the present invention to provide a method and a device that allow deriving uncertainties of output values during runtime.

These and other objects and advantages are achieved in accordance with the invention by a method for providing output values with associated uncertainties for a flexible modular plant or machine comprising an arrangement of modular entities. Uncertainty information is assigned, associated with the operation of the respective modular entity is assigned to a plurality of modular entities that provides input values, where each input value is based on an operation of the respective modular entity of the plurality of modular entities. A computing unit calculates an output value based on the input values provided by the plurality of modular entities. The computing unit calculates an input value uncertainty for each input value based on the uncertainty information of the modular entity that has provided the input value. Further, the computing unit calculates at least one output value uncertainty or confidence associated with the output value based on propagation of uncertainty and using the input value uncertainties. The output value and the at least one output value uncertainty are provided as output.

It is also an object of the present invention to provide a device for providing output values with associated uncertainties for a flexible modular plant or machine. The flexible modular plant or machine comprises an arrangement of modular entities. Uncertainty information associated with an operation of the respective modular entity is assigned to each modular entity of a plurality of said modular entities. The device comprises an interface and a computing unit. The interface is configured to receive, by the plurality of modular entities, input values based on an operation of the plurality of modular entities. The computing unit calculates an output value based on the input values provided by the plurality of modular entities. The computing unit further calculates an input value uncertainty for each input value based on the uncertainty information of the modular entity that has provided the input value. The computing unit is further configured to calculate at least one output value uncertainty associated with the output value based on propagation of uncertainty using the input value uncertainties. The interface is configured to output the output value and the at least one output value uncertainty.

In accordance with the invention, information about the uncertainties of the modular entities is available and provided in a formal way that allows for application in digital processes. Accordingly, the computing unit can provide an automatic calculation of the output value uncertainties via propagation of uncertainty. If the arrangement of modular entities changes, for instance, by adding or removing modular entities or by arranging the modular entities in a different way, then the updated uncertainty information of the modular entities according to the new arrangement is provided to the computing unit. The computing unit may therefore calculate updated output value uncertainties based on the new arrangement of the modular entities.

Preferably, the computing unit calculates the output value and/or the output value uncertainty based on the arrangement of the modular entities. If the arrangement of modular entities changes, then the output unit will automatically update the calculation of the output value and/or the output value uncertainty. Accordingly, during runtime, output values and output value uncertainties are automatically correctly calculated based on the respective configuration of the modular entities of the flexible modular plant or machine.

In accordance with a further embodiment of the method, at least one calculation tree is provided, which describes how the output value is calculated based on the input values. Each node of the calculation tree corresponds to certain values, such as input and output values or values appearing at intermediate steps of the calculation. In addition, each node may comprise additional information, such as the uncertainty assigned to the respective value.

In accordance with an embodiment of the method, external nodes of the at least one calculation tree correspond to the input values provided by the plurality of modular entities. Internal nodes of the at least one calculation tree correspond to intermediate steps in calculating the output value. A root node of the at least one calculation tree corresponds to the output value.

In accordance with a further embodiment of the method, a list of the plurality of modular entities is provided for each calculation tree. The list is ordered according to the contributions of the modular entities to the output value uncertainty, based on the at least one calculation tree and based on the input value uncertainties. By inspecting the list, an engineer can easily identify modular entities having a huge influence on the output value uncertainties. Therefore, it becomes easier to modify the arrangement of the modular entities to reduce the uncertainties. For example, the information may be provided in form of a "heat map" that graphically shows which modular entities contribute more or less to the output value uncertainties.

In accordance with a further embodiment of the method, an engineering recommendation regarding the modular entities is provided based on the list of the modular entities. Engineering recommendation may be provided in form of a list of preferred options, such as rearranging certain modular entities.

In accordance with yet another further embodiment of the method, the engineering recommendation comprises a recommendation to replace at least one of the modular entities by at least one modular entity with a reduced uncertainty. For example, a sensor may be replaced by a more precise sensor, e.g., based on a different operation principle.

In accordance with a still further embodiment of the method, if a plurality of different calculation trees is provided for calculating the output value, corresponding to different ways to calculate the output value, then the optimal calculation tree is determined, resulting in the lowest output value uncertainty. The order in which different input values are processed to provide an output value can have significant effects on the at least one uncertainty value of the output value. Accordingly, different calculation trees may result in different uncertainty values. By choosing optimal calculation trees, the total error of the calculations can be minimized.

In accordance with a further embodiment of the method, at least one of a trust value and a time stamp is assigned to the output value. The trust value or confidence may be a value that can be changed manually or automatically to indicate how valid the output value is.

In accordance with another embodiment of the method, the trust value of the output value is determined based on the time stamp of the output value. For example, the trust value may be reduced as the time passes since the actual measurement increases.

In accordance with a further embodiment of the method, the modular entities comprise sensors for measuring physical and/or chemical quantities. The sensors may comprise any active or passive equipment, e.g., thermal elements, light sensors, mechanical or electronic sensors.

In accordance with a still further embodiment of the method, it is determined whether a configuration of the modular entities complies with uncertainty requirements using the at least one output value uncertainty. For instance, there may be provided a threshold for the uncertainty values. The configuration of the modular entities only complies with the uncertainty requirements if the at least one output value uncertainty is smaller than the respective threshold.

In a further embodiment of the method, calculating the at least one output value uncertainty depends on the arrangement of the modular entities. The calculation of the at least one output value uncertainty is updated if the arrangement of the modular entities changes.

In accordance with a further embodiment of the method, calculating the at least one output value uncertainty is performed using code injection or overloading. Code injection, in this context, means that for computation steps for the calculation of the output value, there are corresponding computations for calculation of the at least one output value uncertainty associated with the output value. The corresponding computations may be performed in parallel. In accordance with other embodiments, calculation of the at least one output value uncertainty is performed immediately before or immediately after the respective calculation of the output value. Overloading may be used in the context of object-oriented programming to calculate both the output value and the respective output value uncertainty.

In accordance with a further embodiment of the method, the corresponding uncertainty information associated with the operation of the modular entity is assigned to a digital twin of the modular entity for each modular entity.

It is also an object of the invention to provide a computer program comprising executable program code configured to, when executed (e.g., by a computing device), perform the method in accordance with the disclosed embodiments of the invention.

It is also an object of the invention to provide a non-transitory computer-readable data storage medium comprising executable program code configured to, when executed (e.g., by a computing device), perform the method in accordance with the disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in greater detail with reference to exemplary embodiments depicted in the drawings as appended. The accompanying drawings are included to provide a further understanding of the present invention and are incorporated in and constitute a part of this specification. The drawings illustrate embodiments of the present invention and together with the description serve to explain the principles of the invention, in which.

DETAILED DESCRIPTION OF THE EXEMPLARY EMBODIMENTS

Figure 1:
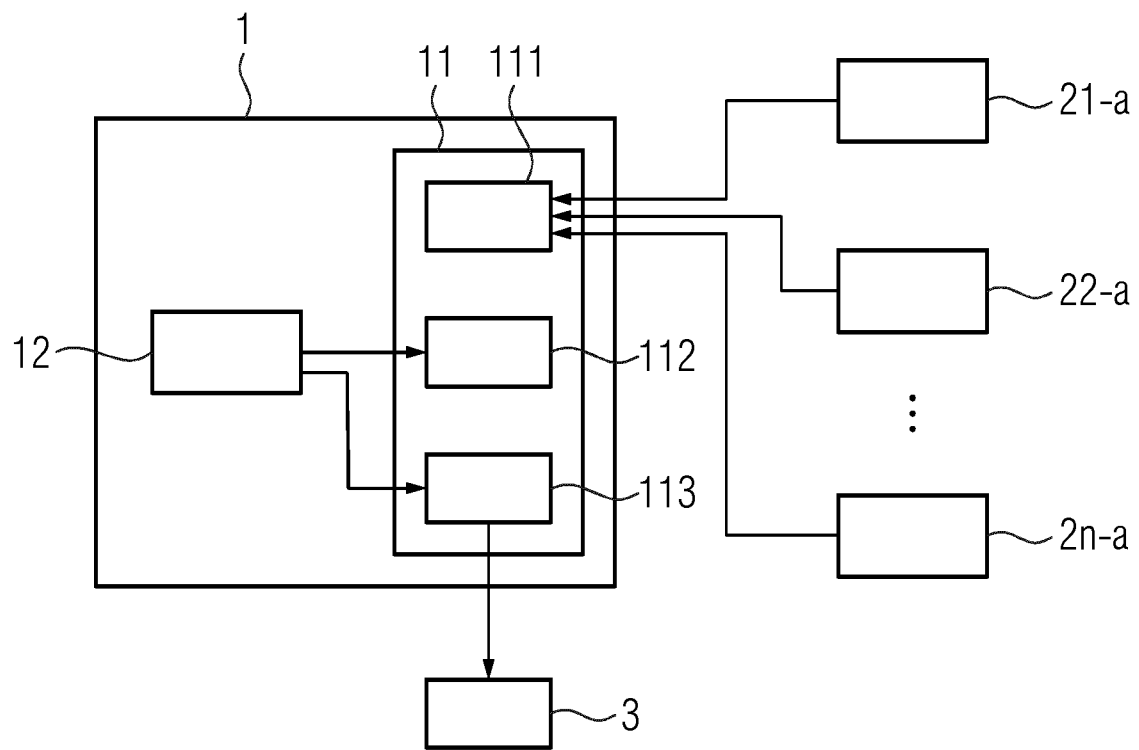
FIG. 1 schematically shows a block diagram illustrating a device for providing output values with associated uncertainties for a flexible modular plant in accordance with an embodiment of the invention.

FIG. 1 shows a block diagram illustrating a device 1 for providing output values with associated uncertainties for a flexible modular plant. Whereas the invention will, in the following, be described with respect to a flexible modular plant, it is also applicable to a flexible modular machine. The device 1 comprises an interface 11 that is connected to a plurality of modular entities 21-$a$ to 2$n$-$a$, where n is an integer value greater than one. The modular entities 21-$a$ to 2$n$-$a$ are physical equipment that can be combined during runtime. The modular entities 21-$a$ to 2$n$-$a$ may comprise electrical wiring, walls, pipes, machines, actuators and sensors. The modular entities 21-$a$ to 2$n$-$a$ are installed in accordance with a certain arrangement that describes the way in which the modular entities are connected to each other or interconnected. The arrangement may change during runtime. For example, during runtime, new modular entities 21-$a$ to 2$n$-$a$ may be added or may be connected to already existing modular entities 21-$a$ to 2$n$-$a$, and already existing modular entities 21-$a$ to 2$n$-$a$ may be disconnected from the arrangement or may be replaced by possibly different modular entities 21-$a$ to 2$n$-$a$.

The engineering and planning of the flexible modular plant may be based on digital twins assigned to the modular entities 21-$a$ to 2$n$-$a$. Further, uncertainty information is associated with an operation of the modular entities 21-$a$ to 2$n$-$a$. The digital twins may comprise the uncertainty information. The uncertainty information may be associated with each modular entity 21-$a$ to 2$n$-$a$ of the modular entities 21-$a$ to 2$n$-$a$. Uncertainty information can also be associated with a subset of the modular entities 21-$a$ to 2$n$-$a$, e.g., with all or a subset of the sensors and/or actuators. The uncertainty information may be provided in the form of a lookup table specifying the uncertainty associated with a certain input value provided by the corresponding modular entity 21-$a$ to 2$n$-$a$. If the uncertainty is equal to a certain percentage, irrespective of the specific input value provided by the modular entity 21-$a$ to 2$n$-$a$, then the uncertainty information may consist of the percentage.

At least some of the modular entities 21-$a$ to 2$n$-$a$ provide input data to the device 1 via an input unit 111 of the interface 11. The input unit 111 may be any kind of port or link or interface capable of receiving information from the modular entities 21-$a$ to 2$n$-$a$, e.g., WLAN, Bluetooth, ZigBee, Profibus or ETHERNET.

The input data provided by the modular entities 21-$a$ to 2$n$-$a$ based on an operation of the modular entities 21-$a$ to 2$n$-$a$ may comprise measurement data generated based on the measurement of the modular entities 21-$a$ to 2$n$-$a$ related to the environment of the respective modular entity 21-$a$ to 2$n$-$a$ or related to the modular entity 21-$a$ to 2$n$-$a$ itself. For example, the input data may comprise measurement of a temperature, a weight, and/or a pressure. Input data may also comprise information regarding the modular entities 21-$a$ to 2$n$-$a$, e.g., consumption or runtime of the modular entity 21-$a$ to 2$n$-$a$.

The input data is further processed by a computing unit 12 of the device 1. The computing unit 12 can comprise at least one of a central processing unit (CPU) or graphics processing unit (GPU) such as a microcontroller ($\mu$C), an integrated circuit (IC), an application-specific integrated circuit (ASIC), an application-specific standard product (ASSP), a digital signal processor (DSP), or a field programmable gate array (FPGA). The computing unit 12 may further comprise a memory or medium for storing data processed during operation, e.g., the received input data.

The computing unit 12 calculates an output value based on the input values provided by the plurality of modular entities 21-$a$ to 2$n$-$a$. The output value can, for example, be a physical or chemical quantity related to an end product made in the flexible modular plant. For example, the output value may comprise a weight of the end product. The output value can be computed based on several input values, e.g., corresponding to weights of intermediate products. The way the input values are taken into account for calculating the output value depends on the configuration or arrangement of the modular entities 21-$a$ to 2$n$-$a$ of the flexible modular plant.

The computing unit 12 further calculates an input value uncertainty for each input value based on the uncertainty information of the modular entities 21-$a$ to 2$n$-$a$. For example, the uncertainty information associated with a specific modular entity 21-$a$ to 2$n$-$a$ may specify that a measurement value provided by the modular entity 21-$a$ to 2$n$-$a$ has an uncertainty of 10 percent. The computing unit 12 calculates the input value uncertainty for the input value provided by the modular entity 21-$a$ to 2$n$-$a$ to be 10 percent of the input value. The computing unit 12 may compute the output value uncertainty using code injection or overloading.

The computing unit further computes at least one output value uncertainty associated with the output value. The output value uncertainty is computed based on propagation of uncertainty methods, i.e., error propagation. Sometimes, there may be several ways to compute the output value based on the input values provided by the modular entities 21-$a$ to 2$n$-$a$. Here, a separate output value uncertainty is calculated for each way to calculate the output value.

The computing unit 12 may further be configured to determine whether the present arrangement of the modular entities 21-$a$ to 2$n$-$a$ complies with predetermined uncertainty requirements. For example, the at least one output value uncertainty can be compared with a predetermined threshold. If the at least one output value uncertainty exceeds the predetermined threshold, then the present arrangement fails to comply with the uncertainty requirements. The computing unit 12 may provide a warning signal.

The interface 11 of the device 1 further comprises a user interface 112 for providing information to a user of the device 1. The user interface 112 may comprise a display, printer, speaker, and the like. The output value and the at least one output value uncertainty are provided to the user via the user interface 112. Further, if the computing unit 12 is provided a warning signal, then the warning signal may be presented to the user via the user interface 112.

The interface 11 of the device 1 further comprises an output unit 113 that may be identical to the input unit 111 or may be a separate unit, such as a WLAN, Bluetooth, ZigBee, Profibus, or ETHERNET interface. The output unit 113 is connected to an external device 3, e.g., a processing unit further configured to process the output value and the output value uncertainty. The external device 3 may be configured to automatically control at least some of the modular entities 21-$a$ to 2$n$-$a$ or to change configurations of the at least one modular entities 21-$a$ to 2$n$-$a$ based on the output value and/or at least one output value uncertainty.

Figure 2:
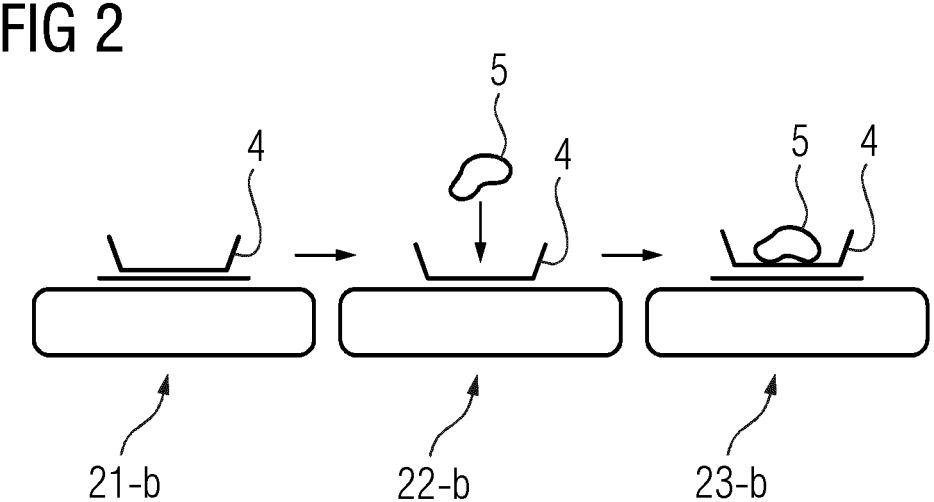
FIG. 2 schematically shows three consecutively arranged modular entities of a flexible modular plant of FIG. 1.

FIG. 2 schematically shows an arrangement of three consecutively arranged modular entities 21-$b$ to 23-$b$ of a flexible modular plant. A first modular entity 21-$b$ comprises means for determining the weight of a tray 4 on a conveyor belt and provides the weight as a first input value to the device 1. A second modular entity 22-$b$ comprises means for inserting a certain product or substance 5 into the tray 4 on a further section of the conveyor belt. A third modular entity 23-$b$ comprises means for measuring the weight of the tray 4 with the product or substance 5. The weight is provided as a second input value to the device 1. The computing unit 12 computes a weight of the product or substance 5 by subtracting the weight of the tray 4 based on the first input value from the weight of the tray 4 with the product or substance 5 based on the second input value. The computing unit 2 further calculates input value uncertainties of the first and second input value based on the uncertainty information associated with the first and third modular entities 21-$b$, 23-$b$. The computing unit 12 further computes an output value uncertainty based on the input value uncertainties of the first and second input values. This calculation is further explained with reference to FIG. 3.

Figure 3:
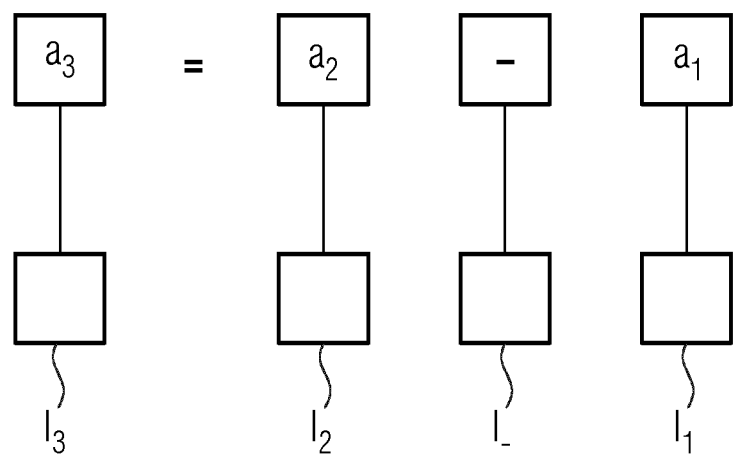
FIG. 3 schematically shows an exemplary calculation of an output value based on input values in accordance with an embodiment of the invention.

FIG. 3 schematically shows an exemplary calculation of an output value based on input values. A first information I_1 is associated with the first input value a_1 corresponding to the weight of the tray 4. The first information I_1 may comprise the value and the unit of the weight, e.g., 5.00 kg. The first information further comprises a lower uncertainty value and a higher uncertainty value, e.g., uncertainty_low=−0.05 and uncertainty_high=0.05, calculated based on the uncertainty information associated with the first modular entity 21-$b$ and on the input value provided by the first modular entity 21-$b$, i.e., the weight value. The first information I_1 may further comprise information regarding a uncertainty distribution, e.g., distribution="equal" corresponding to an equal distribution. The first information I_1 may further comprise a trust value, e.g., trust=98% and may comprise information regarding the derivation of the value, e.g. derivation→certificate1, that is the value is an original input not based on prior calculations.

A corresponding second information I_2 is associated with the second input value a_2 corresponding to the weight of the tray 4 with the product or substance 5. The second information I_2 comprises the value and unit, e.g., 7.8 kg, the uncertainty, e.g., uncertainty_low=−0.10, uncertainty_high=0.10, the distribution, e.g., "equal", the trust, e.g. 100 percent, and the derivation, e.g., derivation→certificate2.

Further, information I_- is associated with the calculation step of subtracting the first value a_1 from the second value a_2. The information I_- comprises the calculation prescription, e.g. value=value.a2−value.a1, the unit, e.g. kg, and the lower and upper uncertainty values, e.g.:

uncertainty_low=abs(uncertainty_low.$a$1)+abs(uncertainty_low.$a$2)

uncertainty_high=abs(uncertainty_high.$a$1)+abs(uncertainty_high.$a$2)

The information I_- further comprises a distribution, e.g. "equal", a trust, e.g., min(trust.a1,trust.a2) and information, e.g., derivation→derivation.g1, derivation.g2.

Further, third information I_3 is associated with the output value a_3, comprising a value and a unit, e.g., 2.8 kg, uncertainty bounds, e.g. uncertainty_low=−0.15, uncertainty_high=0.15, a distribution, e.g., "equal, a trust, e.g. 98 percent, and a derivation, e.g., ("-",a2,a1); a2→certificate2, a1→certificate1. The third information I_3 is generated based on the first information I_1, the second information I_2 and the information I_-. The computing unit 12 may compute the uncertainty bounds, i.e., the output value uncertainty associated with the output value based on standard methods of propagation of uncertainty, for example, as provided in norms such as DIN 1319.

The information I_1, I_2, I_3, I_- may be stored in a memory of the computing unit 12.

Figure 4:
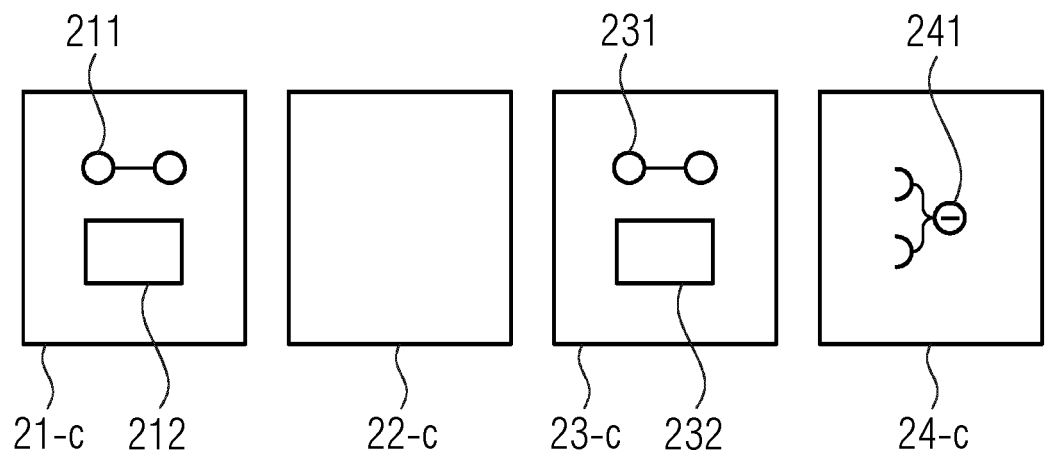
FIG. 4 schematically shows a plurality of modular entities of a flexible modular plant prior to arrangement of the modular entities in accordance with an embodiment of the invention.

FIG. 4 schematically shows a plurality of four modular entities 21-$c$, 22-$c$, 23-$c$, 24-$c$ of a flexible modular plant prior to arrangement of the modular entities 21-$c$, 22-$c$, 23-$c$, 24-$c$. The first modular entity 21-$c$ comprises a first sensor 211 and a first certificate 212, the third modular entity 21-$c$ comprises a second sensor 231 and a second certificate 232. The fourth modular entity 24-$c$ comprises means 241 for computing the difference of the value provided by the second sensor 231 and the first sensor 211.

Figure 5:
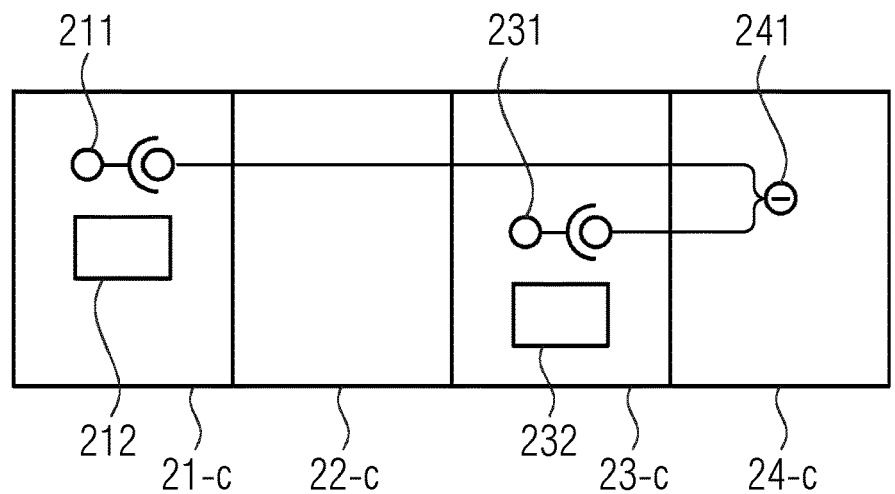
FIG. 5 schematically shows a plurality of modular entities of a flexible modular plant after arrangement of the modular entities in accordance with an embodiment of the invention.

FIG. 5 schematically shows the four modular entities 21-$c$, 22-$c$, 23-$c$, 24-$c$ of FIG. 4 after arrangement of the modular entities 21-$c$, 22-$c$, 23-$c$, 24-$c$. The first sensor 211 is connected via the second modular entity 22-$c$ and the third modular entity 23-$c$ to an input of the means 241 of the fourth modular entity 24-$c$. The second sensor 232 is connected to an input of the means 241 of the fourth modular entity 24-$c$.

Figure 6:
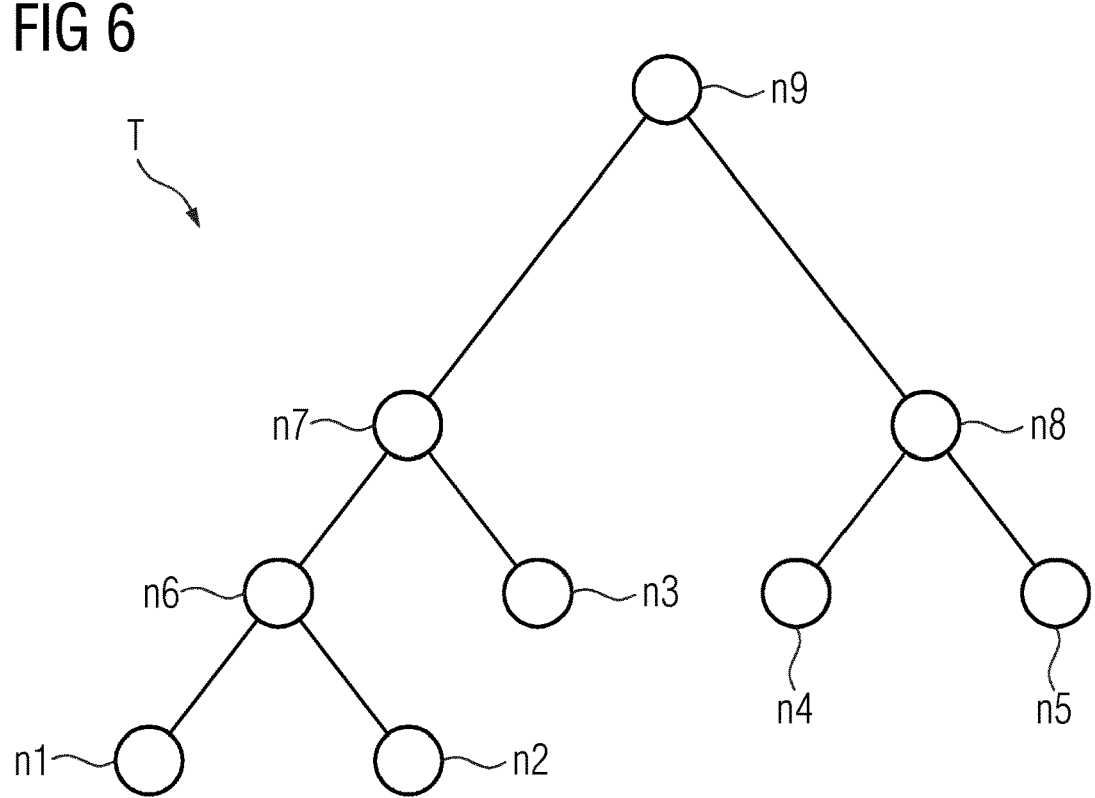
FIG. 6 schematically shows a calculation tree for calculating an output value in accordance with an embodiment of the invention.

FIG. 6 schematically shows a calculation tree T for calculating an output value. The computing unit 12 may provide such a calculation tree T corresponding to how the output value is calculated based on the input values. For example, five external nodes n1 to n5 may correspond to five input values provided by modular entities. The calculation tree further comprises three internal nodes n6, n7, n8 responding to intermediate steps in calculating the output value. For example, a value associated with a first internal node n6 is calculated based on values associated with the first and second input values n1 and n2. The values of the second and third internal nodes n7, n8 are based on a calculation based on values associated with the first internal node n6 and the third external node n3 or the fourth and the fifth external node n4, n5, respectively. A root node n9 of the calculation tree T corresponds to an output value calculated based on the values of the second and third internal nodes n7, n8. The calculations may, for instance, comprise an addition, a subtraction or other mathematical operations applied to the values of the respective nodes.

Figure 7:
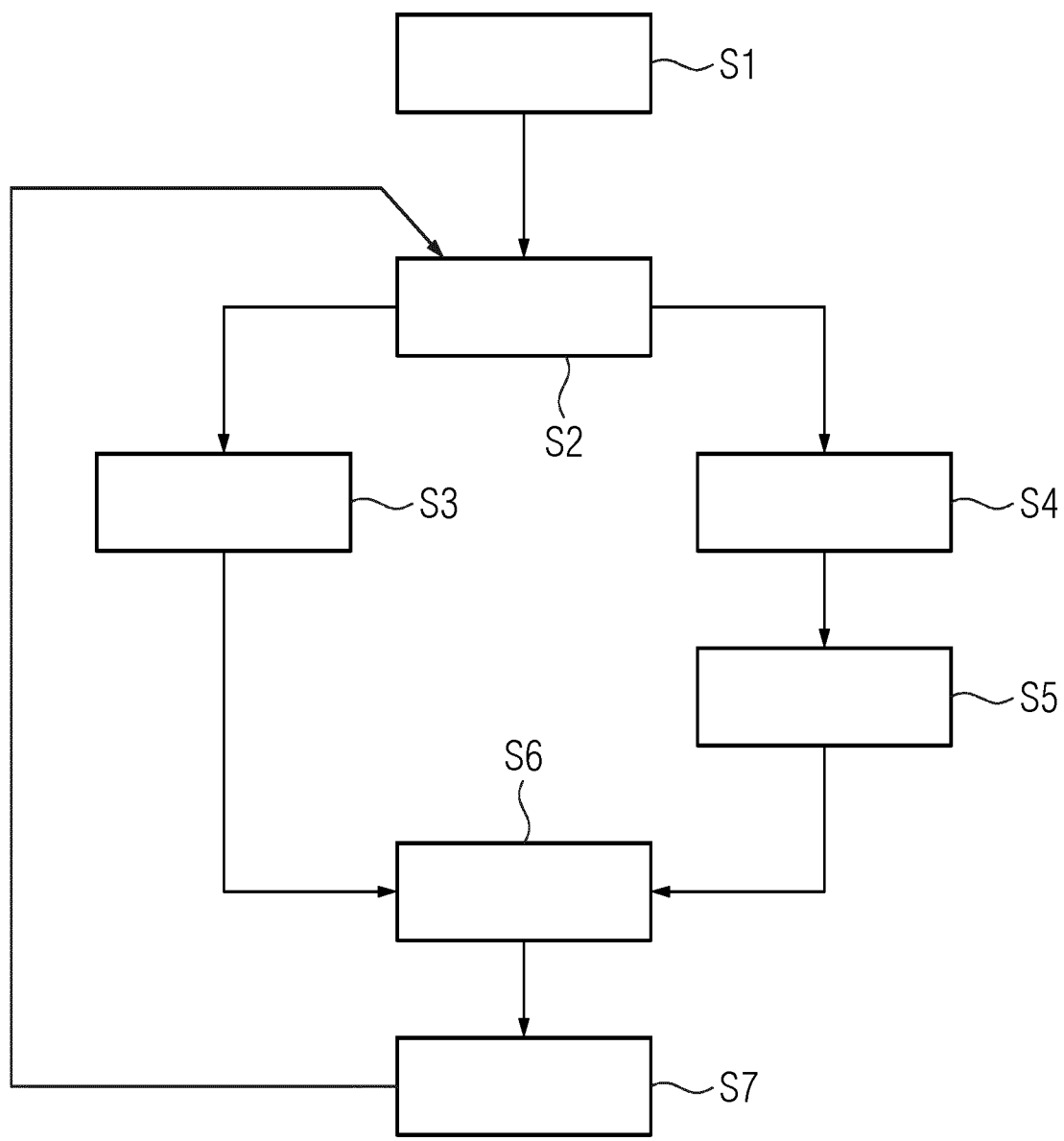
FIG. 7 schematically shows a flow diagram of a method for providing output values with associated uncertainties for a flexible modular plant in accordance with an embodiment of the invention.

FIG. 7 schematically shows a flow diagram of a method for providing output values with associated uncertainties for a flexible modular plant according to an embodiment of the invention. The modular plant comprises an arrangement of a first plurality of modular entities.

In a first step S1, uncertainty information associated with an operation of the respective modular entity is provided to each modular entity of a second plurality of modular entities. The second plurality of modular entities may be identical to or maybe a subset of the first plurality of modular entities. The uncertainty information may be added to a digital twin of the respective modular entity.

In a second step S2, at least some of the modular entities of the second plurality of modular entities provides input values to a device 1 for providing output values, as described above. The input values may comprise measurement data provided by said modular entities.

In a third step S3, a computing unit 12 of the device 1 calculates an output value based on the input values provided by the modular entities. The computing unit 12 may further provide a calculation tree T associated with the calculation of the output value based on the input values. For different ways to calculate the output value, different calculation trees T may be provided.

In a fourth step S4, the computing unit 12 further computes an input value uncertainty for each input value based on the uncertainty information of the modular entity providing the input value.

In a fifth step S5, the computing unit calculates at least one output value uncertainty associated with the output value based on propagation of uncertainty and using the input value uncertainties. The step S3 may be performed in parallel with steps S4 and S5. The step S3 may also be performed before or after steps S4 and S5. Further, a trust value and/or a time stamp may be assigned to the output value. The trust value can be determined based on the time stamp of the output value. The output value uncertainty may be computed using code injection or overloading.

In a sixth step S6, the output value and the at least one output value uncertainty are provided as output to a user, e.g., on a display. Further, the computing unit 12 may provide a list of the modular entities being ordered in accordance with the contributions of the modular entities to the output value uncertainty. For computing the list, the computing unit 12 goes through the calculation tree T to track the contributions to the output value uncertainty. An engineering recommendation may be provided by the computing unit 12 to the user via the user interface 112 based on the ordered list. For example, the user may be advised to replace or update modular entities having a high contribution to the output value uncertainty. If there are several calculation trees T, corresponding to different ways to calculate the output value, then the optimal calculation tree may be determined by the computing unit 12, resulting in the lowest output value uncertainty. The calculation tree may be presented to the user as an optimal way to calculate the output value.

In an additional step S7, the modular entities may be rearranged. The method starts over from step S2, i.e., the output value and at least one output value uncertainty are updated. The modular entities may be rearranged if the arrangement of the modular entities fails to comply with predetermined uncertainty requirements based on an assessment of the computing unit 12 using the at least one output value uncertainty.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing output values with associated uncertainties for a flexible modular plant or machine comprising an arrangement of modular entities, the method comprising:
    combining a plurality of said modular entities into an arrangement during runtime of the flexible modular plant or machine, the arrangement describing how the modular entities are interconnected;
    assigning uncertainty information associated with an operation of a modular entity to the plurality of said modular entities;
    providing, by said plurality of modular entities, input values based on an operation of said modular entities;
    calculating, by a computing unit, depending on the arrangement of the plurality of modular entities, an output value based on said input values provided by said plurality of modular entities;
    calculating, by said computing unit, an input value uncertainty for each input value based on the uncertainty information of the modular entity providing the input value;
    calculating, by said computing unit, depending on the arrangement of the plurality of said modular entities, at least one output value uncertainty associated with the output value based on propagation of uncertainty and using the input value uncertainties;
    outputting said output value and said at least one output value uncertainty;
    modifying the combined plurality of said modular entities of the arrangement during runtime of the flexible modular plant or machine based on the output value and said at least one output value uncertainty; and
    providing at least one calculation tree describing how said output value is calculated based on said input values;
    wherein, if a plurality of different calculation trees is provided for calculating the output value, corresponding to different ways to calculate said output value, then an optimal calculation tree is determined which results in a lowest output value uncertainty.

2. The method according to claim 1, wherein external nodes of said at least one calculation tree correspond to said input values provided by said plurality of modular entities; wherein internal nodes of said at least one calculation tree correspond to intermediate steps in calculating the output value; and wherein a root node of said at least one calculation tree corresponds to said output value.

3. The method according to claim 1, further comprising:
providing a list of said plurality of modular entities for each calculation tree based on said at least one calculation tree and said input value uncertainties
wherein said list is ordered according to contributions of the plurality of modular entities to the output value uncertainty.

4. The method according to claim 2, further comprising:
providing a list of said plurality of modular entities for each calculation tree based on said at least one calculation tree and said input value uncertainties
wherein said list is ordered according to contributions of the plurality of modular entities to the output value uncertainty.

5. The method according to claim 3, further comprising:
providing an engineering recommendation regarding said plurality of modular entities based on said list of said plurality of modular entities.

6. The method according to claim 5, wherein said engineering recommendation comprises a recommendation to replace at least one of said modular entities of said plurality of modular entities by at least one modular entity with a reduced uncertainty.

7. The method according to claim 1, further comprising:
assigning at least one of a trust value and a time stamp to said output value.

8. The method according to claim 7, wherein the trust value of said output value is determined based on the time stamp of said output value.

9. The method according to claim 1, wherein the modular entities comprise sensors for measuring at least one of physical and chemical quantities.

10. The method according to claim 1, further comprising:
determining whether said arrangement of said plurality of modular entities complies with uncertainty requirements utilizing said at least one output value uncertainty.

11. The method according to claim 1, wherein calculating said at least one output value uncertainty depends on said arrangement of said modular entities; and wherein said calculation of said at least one output value uncertainty is updated if said arrangement of said plurality of modular entities changes.

12. The method according to claim 1, wherein calculating said at least one output value uncertainty is performed utilizing code injection or overloading.

13. The method according to claim 1, wherein the corresponding uncertainty information associated with the operation of said modular entity is assigned to a digital twin of said modular entity for each modular entity of said plurality of modular entities.

14. A device for providing output values with associated uncertainties for a flexible modular plant or machine, the modular plant or machine comprising an arrangement of a combination of modular entities, the combination of the modular entities being subject to be made or changed during runtime of the flexible modular plant or machine, and uncertainty information associated with an operation of said modular entity being assigned to a plurality of said modular entities, the device comprising:
an interface configured to receive, by said plurality of modular entities, input values based on an operation of said modular entities; and
a computing unit configured to calculate an output value based on said input values provided by said plurality of modular entities, configured to calculate an input value uncertainty for each input value based on the uncertainty information of a modular entity providing the input value and, during runtime, configured to calculate at least one output value uncertainty associated with the output value based on propagation of uncertainty using the input value uncertainties;
wherein said interface is configured to output said output value and said at least one output value uncertainty;
wherein at least one calculation tree describing how said output value is calculated based on said input values is provided;
wherein the combined plurality of said modular entities of the arrangement is modified during runtime of the flexible modular plant or machine based on the output value and said at least one output value uncertainty output from said interface; and
wherein, if a plurality of different calculation trees is provided for calculating the output value, corresponding to different ways to calculate said output value, then an optimal calculation tree is determined which results in a lowest output value uncertainty.

* * * * *